(12) United States Patent
Chu et al.

(10) Patent No.: US 8,303,239 B2
(45) Date of Patent: Nov. 6, 2012

(54) PERCUSSIVE SHOVEL FOR ROBOTIC APPLICATIONS

(75) Inventors: Philip Chu, Friendswood, TX (US);
Jack Wilson, Brooklyn, NY (US); Jack Craft, Metuchen, NJ (US); Kiel Davis, South Orange, NJ (US)

(73) Assignee: Honeybee Robotics, Ltd., New York, NY (US)

( * ) Notice: Subject to any disclaimer, the term of this patent is extended or adjusted under 35 U.S.C. 154(b) by 156 days.

(21) Appl. No.: 12/861,710

(22) Filed: Aug. 23, 2010

(65) Prior Publication Data
US 2012/0111587 A1    May 10, 2012

Related U.S. Application Data

(60) Provisional application No. 61/272,174, filed on Aug. 26, 2009.

(51) Int. Cl.
*E02F 3/02* (2006.01)
*A01B 1/00* (2006.01)

(52) U.S. Cl. .................................. 414/744.2; 172/101

(58) Field of Classification Search ............ 37/403–416, 37/466, 468, 348; 172/101, 102; 414/744.2, 414/744.3; 173/49, 94, 109, 122, 128, 124, 173/15, 11, 13, 18, 211; 299/37.5, 37.1, 299/37.3; 30/169, 170; 15/93.1
See application file for complete search history.

(56) References Cited

U.S. PATENT DOCUMENTS

| 3,269,039 | A | * | 8/1966 | Bodiue | 37/411 |
| 4,095,752 | A | * | 6/1978 | Pomeret et al. | 414/744.2 |
| 4,621,562 | A | * | 11/1986 | Carr et al. | 89/41.05 |
| 5,382,885 | A | * | 1/1995 | Salcudean et al. | 318/568.11 |
| 5,672,044 | A | * | 9/1997 | Lemelson | 414/744.3 |
| 6,128,979 | A | * | 10/2000 | Shepherd | 81/45 |
| 6,192,995 | B1 | * | 2/2001 | Yamada | 173/15 |

* cited by examiner

*Primary Examiner* — Robert Pezzuto
(74) *Attorney, Agent, or Firm* — Leighton K. Chong

(57) ABSTRACT

A percussive digging tool attachment for a small robotic platform employs a percussor module for applying percussive impulses of relatively low impact at relatively high frequency to an attached digging tool to dig into or break up soil and rocks. By using low-impact, high-frequency percussive forces, it reduces the reaction loads on the small robotic platform while providing increased capability.

5 Claims, 4 Drawing Sheets

PERCUSSIVE SHOVEL FOR ROBOTIC APPLICATIONS

This U.S. Patent Application claims the priority of U.S. Provisional Application 61/272,174 filed on Aug. 26, 2009.

This invention was made with Government support from U.S. Navy Explosive Ordnance Disposal Technology Division through the National Center for Defense Robotics, subcontract NCDR-07-23-SC. The Government has certain rights in the invention.

TECHNICAL FIELD

The described invention relates to small robotic platforms designed to effectively dig into or break up soil and rocks.

BACKGROUND OF INVENTION

Small robotic platforms are lightweight and therefore are limited in the digging forces they can react, making it difficult to progress very far into soil, particularly hard soil. It has been shown that using a percussive or vibratory shovel on a small robotic arm allows the arm to make significant progress into the soil, where little to no progress was possible using a standard shovel.

Prior art for percussive digging consists of commercially available digging attachments for pneumatic or electric hammers, such as the Hilti TE-S-SPI clay spade. These attachments greatly enhance a user's capability to break up tough soils and even concrete. Such digging attachments include purpose-built passive digging implements, generally resembling shovels, hoes, or rakes.

The disadvantages of the prior art are many. Current percussive digging solutions are much too heavy to be mounted to a small robotic platform, and current digging tools for small robotic platforms do not deliver meaningful digging capability in strong soils. Small robotic platforms are inherently limited in their payload capacity, and their low mass limits the amount of downforce that they can provide for digging. They are too light to push a shovel blade or other implement into soil or other target material, but at the same time they are also too small to support the mass and power needs of a conventional heavy-duty percussive digger. This challenge is amplified for planetary exploration robots, where the reduced gravity of the Moon or Mars provides less available downforce per unit mass.

SUMMARY OF INVENTION

In accordance with the present invention, a percussive digging tool attachment for a small robotic platform comprises: an attachment mechanism for attaching a digging tool to an end of a robotic arm of the small robotic platform; a tool deployment mechanism coupled to the attachment mechanism for deploying the digging tool on the end of the robotic arm with a desired range of articulated motion; a percussor module coupled to the tool deployment mechanism for applying percussive impulses of relatively low impact at relatively high frequency to an attached digging tool; and a digging tool coupled to a percussion output end of the percussor module for applying the percussive impulses of relatively low impact at relatively high frequency to dig into or break up soil and rocks.

The present invention provides an improved efficacy for percussively digging into soil and/or rock from a robotic arm. All other known robotic arm digging devices use some form of passive shovel that relies on the strength of the arm to defeat the soil. Using a percussive module to apply percussive impulses of relatively low impact at relatively high frequency to the digging tool is highly beneficial for small robotic platforms, which are limited in the reaction forces they can absorb for digging. This is very important for applications in planetary exploration due to highly consolidated soils and low gravitational forces. For example, a rover on the moon must contend with highly compact soil and gravity that is only ⅙th that of Earth's.

Other objects, features, and advantages of the present invention will be explained in the following detailed description of the invention having reference to the appended drawings.

DESCRIPTION OF EMBODIMENTS

In the following detailed description of the invention, certain preferred embodiments are illustrated providing certain specific details of their implementation. However, it will be recognized by one skilled in the art that many other variations and modifications may be made given the disclosed principles of the invention.

Figure 1B:
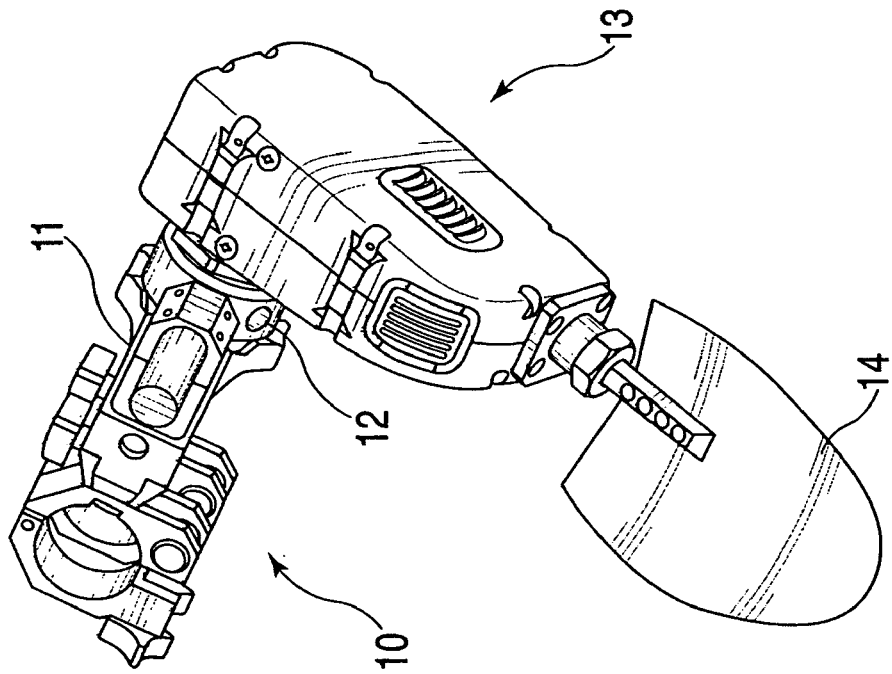
FIGS. 1A and 1B are rear and front perspective views, respectively, of a percussive digging tool attachment for a small robotic platform in accordance with the present invention.
Figure 1A:
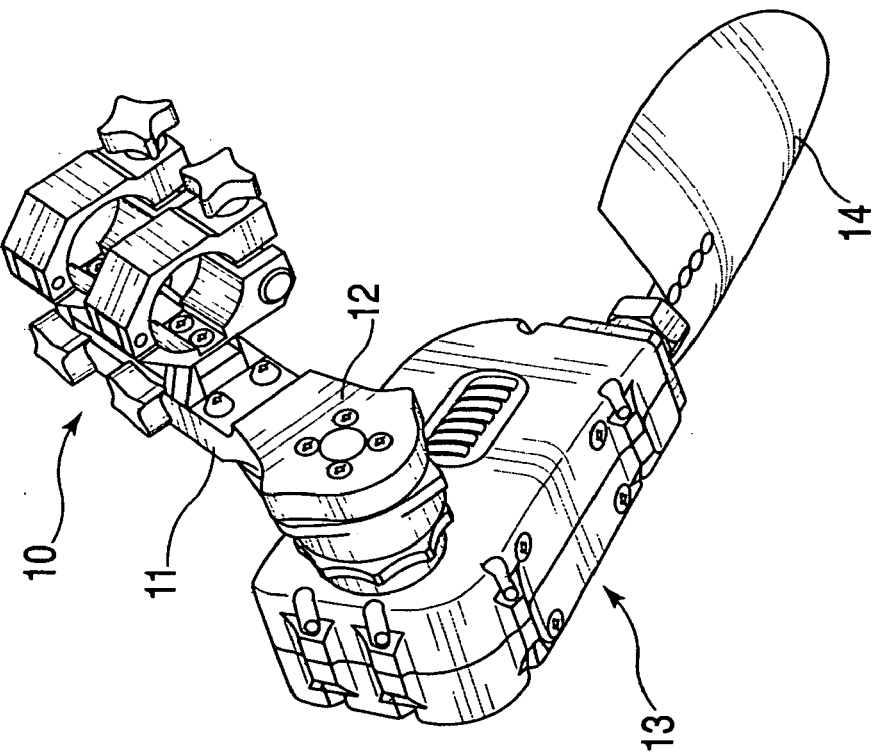

FIGS. 1A and 1B are rear and front perspective views, respectively, of a percussive digging tool attachment for a small robotic platform in accordance with the present invention. The percussive digging tool attachment has an attachment mechanism 10 for attaching a digging tool to an end of a robotic arm of the small robotic platform, such as a pair of forearm clamps secured by thumb screws as shown. An extension 11 from the attachment mechanism 10, such as a Picatinny rail well known in the industry, is coupled to a tool deployment mechanism 12 for deploying the digging tool on the end of the robotic arm with a desired range of articulated motion. A percussor module 13 is coupled to the tool deployment mechanism 12 for applying percussive impulses of relatively low impact at relatively high frequency. An attached digging tool 14 is coupled to a percussion output end of the percussor module 13 for applying the percussive impulses of relatively low impact at relatively high frequency to dig into or break up soil and rocks.

In a preferred embodiment, the percussive digging tool attachment employs a piston-type percussor and a shovel. The digging tool was fastened to the robotic arm by means of clamps and Picatinny rail, and the battery and electronics were housed in the robot's payload bay. The percussive digging tool attachment increases the capability of the small robotic platform to affect its environment. Changing the digging implement can provide alternative capability. For example, substituting a chisel for the shovel as shown can provide the capability to break up hard surfaces.

The percussive digging tool attachment may be controlled through teleoperation or through some level of increased autonomy. The digging tool itself may be controlled through a simple on/off switch, or through some more advanced control. Advanced control could include varying the frequency or amplitude of the percussion or vibration to increase effectiveness, or turning the tool on and off during digging to make more efficient use of available power. This advanced control can operate in response to the sensed soil properties. For example, percussion could be initiated or varied in response to soil resistance as sensed through load cells, strain gauges, or even motor currents in an excavator arm. Varying the frequency of the percussion or vibration can also induce secondary effects, such as improved material flow or vibratory settling of material for structural consolidation. Employing a vacuum-compatible percussive source enables use for planetary exploration applications, such as lunar site preparation.

Figure 2:
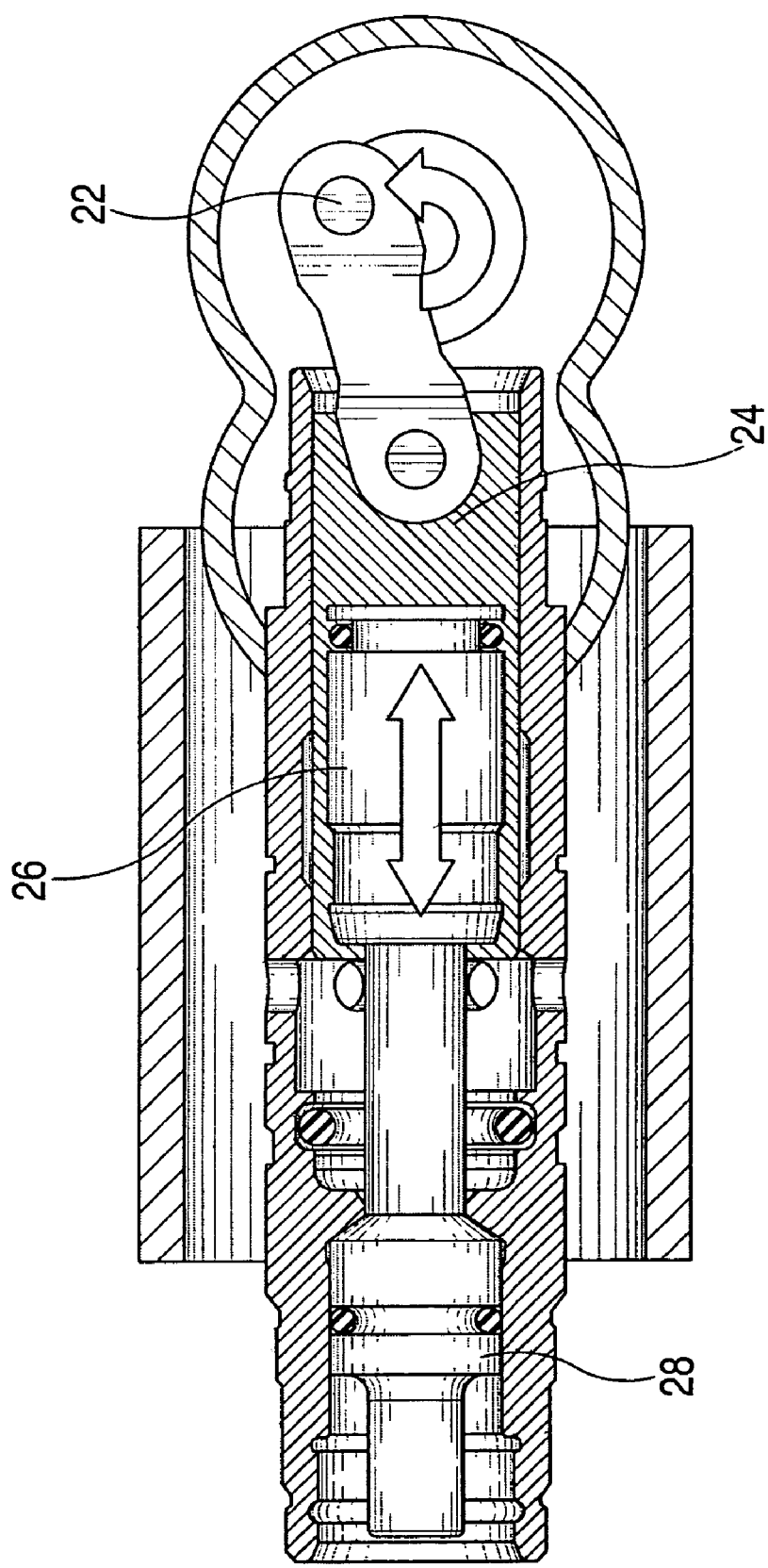
FIG. 2 shows a piston-type percussive module of an "air spring" design

Referring to FIG. 2, a piston-type percussive module is illustrated. The percussive module is of an "air spring" design, in which a rotary motor (not shown) is used to turn a crankshaft 22 to drive in reciprocation a piston cylinder 24 holding a "free mass" 26 which rides inside of and moves with the reciprocating cylinder. At a withdrawal segment of the reciprocation cycle moving to the right side of the figure, the cylinder 24 draws the free mass 26 to the rightmost position. At a release segment of the reciprocation cycle, the free mass is pushed toward the left side of the figure and released for impact by momentum against an anvil 28 coupled or in mechanical abutment with the proximal end of the digging tool.

With each rotational cycle of the crankshaft 22, the free mass is pulled back to start the cycle and released to impact the anvil 28 and digging tool. The frequency can be increased by increasing the motor rotational velocity. The impact energy is a function of the free mass and its velocity. In this manner, a small free mass, such as of 1 kg or lower (even as small as 0.1 kg), can deliver as much or more impact energy as heavy impact-type devices by multiplying the frequency of impacts in a given amount of time. The free mass movement is essentially dictated by the air flow in the reciprocating system. When the reciprocating system is closed, the loss or addition of air to the system is essentially negligible and the system can be considered closed. In its closed state the free mass motion is couple to that of the cylinder. When the system is opened to outside air, the free mass is decoupled from the cylinder's motion and then travels until it strikes the anvil.

Figure 3:
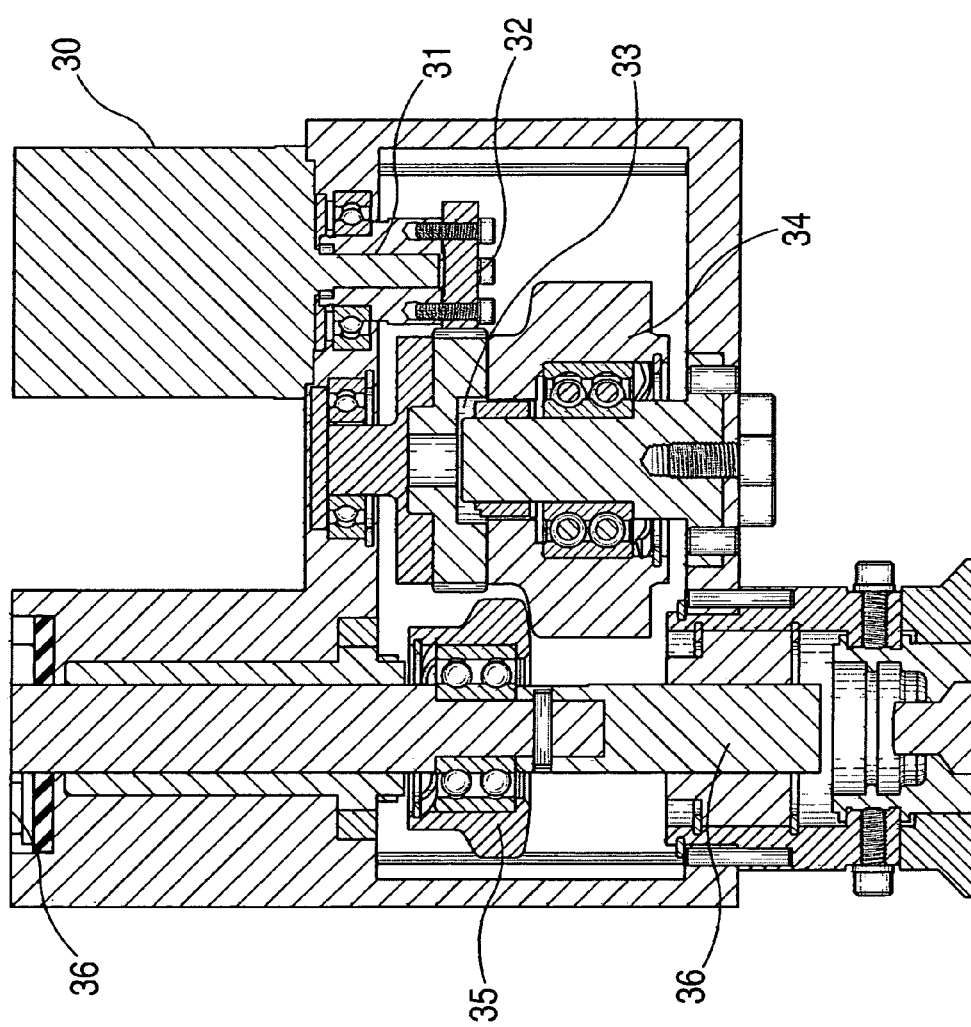
FIG. 3 shows another type of percussive module of a "cam & spring" design.

In FIG. 3, another type of percussive module is shown of a "cam & spring" design. A motor 30 drives a pinion gear coupling 31 to a pinion gear 32 which drives a drive gear 33 which rotates an eccentric cam 34. A cam follower 35 travels in contact with the cam 34 in reciprocation (doubled-headed arrow) as the cam rotates. When traveling in the upward direction in the figure, the follower 35 is lifted and pushed against a compression spring 36 as the cam rotates. When the eccentric part of the cam is reached, the follower is released to travel in the downward direction in the figure under the force of the spring and accelerated until the coupled ram 36 strikes the output shaft anvil 37 which transmits the impact force to the digging tool. With each cycle, the cam 34 picks up the follower 35 again and releases it to impact the anvil. The mechanism frequency can be changed by changing the rotation speed of the motor. The impact energy can be adjusted by selecting the desired spring force.

Figure 4:
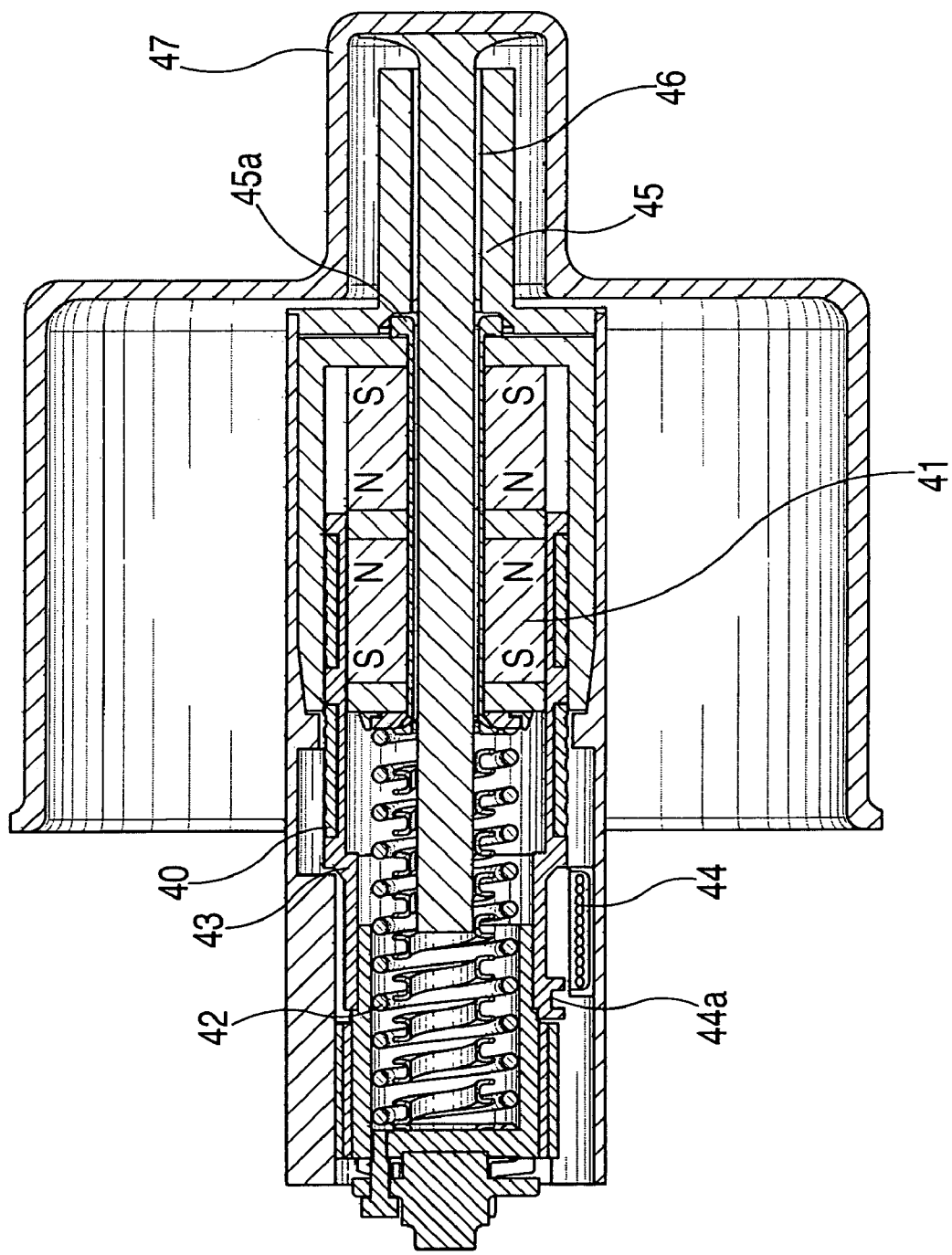
FIG. 4 shows another type of percussive module of a "voicecoil" design.

In FIG. 4, another type of percussive module is shown of a "voicecoil" design. A voltage is applied to send a current through a conductor coil 40 that produces a magnetic force to pull permanent magnets 41 in an axial direction to the left side of the figure against the force of the compression main spring 42. When a bobbin 43 that moves with the magnets 41 actuates a magnet for reed switches 44, the current is cut off and the permanent magnets 41 are released, and the compression force of the main spring 42 is applied to propel a driven end 45a slidable on a bushing 46 against an anvil 45 within a ground assembly 47 which transmits the impact to the digging tool. The higher the voltage applied to the coils is, the higher the force on the magnets and therefore the speed of reciprocation. In this case, the voicecoil is used to preload the spring, then it is suddenly de-energized, or energized in the opposite direction to produce an impact. Control of the voltage applied and current flowing in the coils is used to control the cycling frequency of the device and the impact energy delivered.

The present invention enables a small robotic platform with a percussive digging tool attachment to dig through strong soils faster and while consuming less total energy. It also provides the capability for the digging tool to penetrate materials that it otherwise could not, such as concrete or masonry. By using low-impact, high-frequency percussive forces, it reduces the reaction loads on the small robotic platform while providing increased capability. The percussive digging tool attachment can be packaged into a low mass, low volume envelope mechanism in order to be deployable and stowable on a small robotic arm. It is also shown that with increasing soil strength, the digging capability of the percussive shovel dramatically increases over a passive shovel for any given robotic arm.

It is to be understood that many modifications and variations may be devised given the above description of the general principles of the invention. It is intended that all such modifications and variations be considered as within the spirit and scope of this invention, as defined in the following claims.

The invention claimed is:

1. A percussive digging tool attachment for a small robotic platform comprising:
   an attachment mechanism for attaching a digging tool to an end of a robotic arm of the small robotic platform;
   a tool deployment mechanism coupled to the attachment mechanism for deploying the digging tool on the end of the robotic arm with a desired range of articulated motion;
   a percussor module coupled to the tool deployment mechanism for applying percussive impulses of relatively low impact at relatively high frequency to the attached digging tool;
   a sensor coupled to the robotic platform for sensing soil resistance in an area where the digging tool is to be deployed; and
   a digging tool control for controlling the percussor module in response to soil resistance sensed by the sensor,
   wherein the digging tool is coupled to a percussion output end of the percussor module, and the percussor module is controlled by said digging tool control so that the frequency or amplitude of the applied percussive impulses is varied in response to sensed soil properties detected by said sensor.

2. A percussive digging tool attachment according to claim 1, wherein said percussive module is a piston-type of an air spring design.

3. A percussive digging tool attachment according to claim 1, wherein said percussive module is of a cam-and-spring design.

4. A percussive digging tool attachment according to claim 1, wherein said percussive module is of a voicecoil design.

5. A percussive digging tool attachment according to claim 1, wherein said sensor is selected from a group consisting of: load cells; strain gauges; and motor current sensors for the robotic arm.

* * * * *